March 10, 1959  E. W. BRASCH, JR  2,876,490
RECYCLE APPARATUS FOR CARBON BLACK PELLET MILLS
Filed Dec. 31, 1956

INVENTOR.
E.W. BRASCH, JR.
BY Hudson & Young
ATTORNEYS

United States Patent Office 2,876,490
Patented Mar. 10, 1959

2,876,490

RECYCLE APPARATUS FOR CARBON BLACK PELLET MILLS

Edgar W. Brasch, Jr., Borger, Tex., assignor to Phillips Petroleum Company, a corporation of Delaware Application December 31, 1956, Serial No. 631,524

12 Claims. (Cl. 18—1)

This invention relates to apparatus for pelleting carbon black. In one aspect it relates to apparatus for recycling carbon black pellets in conjunction with an elongated tubular rotating pellet mill. In another aspect it relates to a rapper for preventing carbon black pellet mill recycle apparatus from plugging with carbon black during recycling of carbon black pellets in the pelleting of carbon black.

An object of this invention is to provide apparatus for recycling carbon black pellets in carbon black pelleting operations.

Another object of this invention is to provide apparatus for feeding carbon black pellets into a hose for transfer from the pellet end to the feed end of a carbon black pelleting mill without plugging of the feeding portion of the apparatus.

Another object of this invention is to provide such a recycling apparatus which does not require a separate source of power for its operation.

Still another object of this invention is to provide such an apparatus which is relatively inexpensive to construct and to maintain.

Yet another object of this invention is to provide such an apparatus which is adapted for long time operation without plugging.

Many other objects and advantages will be realized upon reading the following description which, taken with the attached drawing, forms a part of this specification.

In the drawing, Figure 1 illustrates, in diagrammatic form, a conventional carbon black pelleting mill equipped with the apparatus of my invention.

My invention involves broadly a carbon black pellet mill assembly comprising, in combination, a rotatable tubular mill having a feed inlet end and a product outlet end, feeding means for introduction of carbon black to be pelleted into the feed end of said mill, means for discharging product from the product end of said mill, a first carbon black pellet recycle adapter, said adapter being attached to said mill at a point nearer the product outlet end than the feed end thereof, a second carbon black pellet recycling adapter, said second adapter being attached to said mill at a point nearer the feed inlet end than the product outlet end thereof, a flexible hose disposed helically around said mill and communicating said first adapter with said second adapter, said first and second adapters communicating with the interior of said mill in such a manner that upon rotation of said mill in its normal pelleting operation pellets enter said first adapter and pass through said hose and said second adapter into said mill, a first rapper attached to said first adapter, a second rapper attached to said second adapter, and said first and second rappers being adapted to rap their respective adapters upon rotation of said pellet mill thereby preventing deposition of carbon black on the inner walls of said adapters.

The adapter of this apparatus near the product end of the mill is provided with a perforate member disposed between the mill and the adapter so that large pieces of scale which might tend to plug the transfer hose cannot enter the adapter. Each adapter is provided with a rapper disposed on the surface of the adapter in such a manner that as the mill rotates a weighted element within the rapper falls from one end and then to the other end of the adapter housing so as to jar or vibrate the adapter and thereby prevent adherence of carbon black to the inner surfaces of the adapter and the adjacent hose to avoid plugging. Furthermore, the product outlet end adapters are, in general, funnel shaped so as to function by providing a relatively large space for accumulation of carbon black for entry into the pellet recycle hose.

Figure 1:
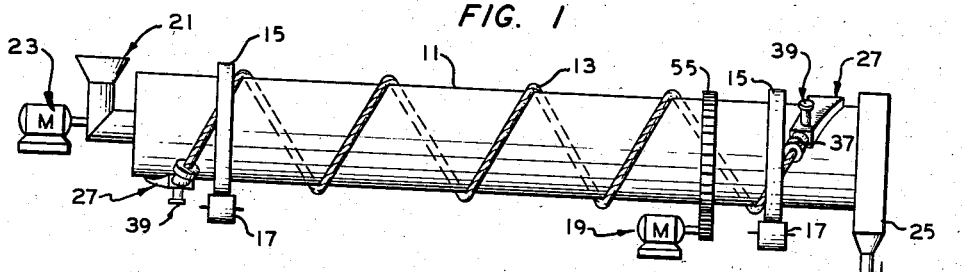

Referring now to the drawing and specifically to Figure 1, reference numeral 11 identifies a tubular elongated rotating pellet mill. Rotation means 19 is provided for rotation of the pellet mill. Steel tires 15 are disposed around the mill at approximately the positions indicated in the drawing for support of the mill. These steel tires roll on rollers 17 for easy rotation and support of the mill. An adapter assembly 27 is disposed over an opening in the wall of the pellet mill near the outlet end of the mill. To the small end of this adapter is attached a flexible hose 13. The other end of hose 13 is attached to a second adapter 27 which is substantially the same type of apparatus as the first mentioned adapter. The hose 13 is threaded between spokes or openings in a support disc or between plates supporting the steel tires 15 and through openings beneath a girth gear 55. Girth gear 55 is a portion of a rotation means 19 of the pellet mill. At the feed end of pellet mill 11 is provided a feed hopper 21 for introduction of carbon black to be pelleted into the feed mechanism 23 of the apparatus. In many instances this feed mechanism is merely a screw conveyor driven by an electric motor for introduction of carbon black to be pelleted into the mill. At the opposite end of the mill is provided a pellet outlet apparatus 25 for withdrawal of finished product from the mill.

Figure 2:
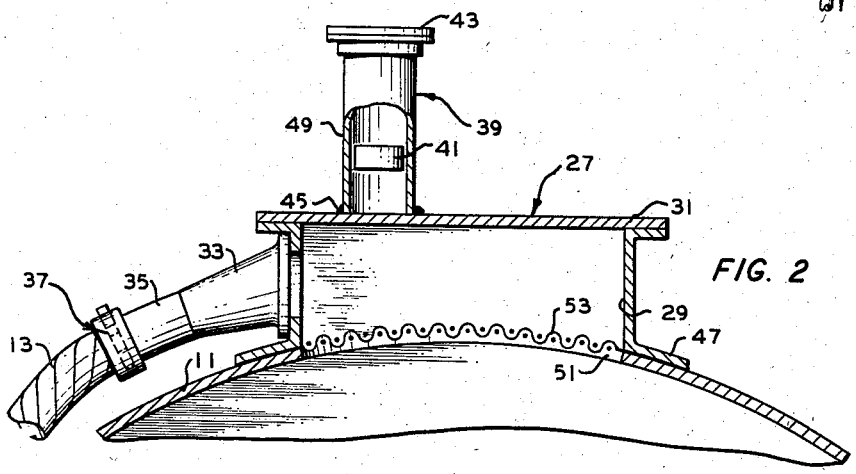
Figure 2 is a longitudinal sectional view, on an enlarged scale, of the pellet feeder and rapper apparatus of Figure 1.
Figure 3:
Figure 3 is a plan view of the apparatus of Figure 2.

Figure 2 illustrates the rapper assembly and adapter of my invention on an enlarged scale. This figure is, specifically, a longitudinal view, partly in section, of the rapper and adapter. An opening 51 is provided in the wall of the tubular mill at a point more or less close to the pellet outlet end of the mill. The rapper and adapter of my invention are disposed near the outlet end of the mill. The adapter is, in general, funnel shaped and so disposed as regards this particular shape that upon rotation of the pellet mill the adapter serves as a hopper for feeding carbon black pellets for recycling into the recycle hose. Such a hopper or adapter is bounded by sidewalls 29 which are covered with a plate 31. The sidewalls are either welded to the walls of the pellet mill or they are provided with flanges 47 for bolting or welding to the walls of the mill. Similarly, the plate 31 is attached to the sidewalls of this adapter either directly by welding or angle irons are provided as means for bolting. On reference to Figure 3, it is noted that the outlet end of the adapter is smaller in cross-sectional area than its other end in order that the adapter may serve as a feeding hopper. Reasonably near the outlet end of the adapter and on top of plate 31 is provided a rapper assembly 39. This rapper assembly is a simple mechanism which applicant has found to be very efficient for its intended purpose of preventing deposition of carbon black on nearby apparatus parts. The rapper comprises a tubular member 49 attached by welds 45, or by other means, to the top surface of cover plate 31 at about the position indicated in the drawing. Within tubular member 49 is disposed a weight 41 which is slightly smaller in diameter than the inner diameter of the tubular member 49 so that as the mill rotates the weight 41 easily slides from one end of the tubular member to the other. The outer end of the tubular member is closed with cover plate 43 so as to retain the weight. The slidable weight 41, in some cases, weighs as much as 5 pounds or more and it is intended that as the mill rotates this weight slides from one end of tubular member 49 to the other and as the weight strikes either end, a jarring effect is achieved thereby preventing deposition of sticky carbon black to the surfaces of the adapter 27 and other adjacent mechanical elements. To the outlet end of adapter 27 is attached a funnel or tapered member 33 which, in turn, is connected with a metal pipe 35 having about the same inner diameter as the inner diameter of the flexible hose 13. An orifice plate assembly 37 is disposed intermediate the metal pipe section or tube 35 and the flexible tube 13 for regulating the rate of entrance of pellets from the adapter assembly to the recycle hose 13. Under some conditions when it is not desired to use the orifice plate assembly, the outer diameter of pipe 35 is about the same as the inner diameter of hose 13 so that hose 13 can be slipped over the adjacent end of metal pipe 35 and clamped.

Screen 53 is interposed over opening 51 and is held in place by flange 47. This screen allows free passage of pellets for recycle but prevents passage of carbon black scale or other large pieces of carbon black into the adapter 27 and tube 13.

The adapter assembly 27 at the feed end of the mill is for passage of recycle pellets into the feed end of the mill and is similar in most respects to that at the outlet end of the mill. The only difference in these adapters is that the feed end adapter is not provided with a screen 53 because there are not large pieces of scale in the recycle pellets. If there were pieces of scale in tube 13, the scale should be allowed to pass freely into the mill. Furthermore, there is no need for the orifice plate assembly 37 and accordingly it is not employed with the adapter at the feed end of the mill.

As an illustration of the details of construction of the adapters and rappers of my invention, are the following dimensions: The adapters are about 15 inches in length and the greatest width is about 10 inches and the smallest width about 5 inches. The adapter cover plate 31 is approximately 5 inches from the outer surface of the pellet mill, that is, the adapter is approximately 5 inches high. The openings in the wall of the pellet mill which are covered by the adapters are approximately the same dimension as inner dimensions of the adapter. The pellet inlet opening in the wall of the pellet mill near the pellet outlet end of the mill is covered by a woven wire screen of approximately ¼ inch mesh. This screen prevents large pieces of scale from possibility of plugging the relatively small diameter of the tube 13. The rapper tube 49 is a 3 inch pipe, that is, its inner diameter is slightly larger than 3 inches. The slide weight 41 is a piece of iron approximately 3 inches in diameter by 3 inches long and weighs about 6 pounds. The length of tube 49 is approximately 11½ inches so that the weight 41 has approximately an 8-inch fall.

The pellet mill to which adapters and rappers of the above dimensions are attached is approximately 6 feet in diameter by 48 feet in length. Such a mill has a pellet output capacity of approximately 15,000 pounds with a recycle rate of about 30,000 pounds per day, that is, the recycle rate is double the pellet product rate. This pellet recycle rate is accomplished by employing an orifice plate having an orifice opening of approximately 1½ inches and using a 2-inch inside diameter flexible tube 13. The pellet mill is rotated at about 18 to 24 R. P. M.

Pellets produced in such an operation have an average size of about the opening of a 30-mesh screen. Less than 1 percent of such pellets pass a 100-mesh screen and substantially none are larger than the opening of a 10-mesh screen. The tube 13 is of such length to provide approximately 4½ turns around the pellet mill between the adapters 27.

It will be obvious that pellet sizes can be varied by changing the rate of rotation of the mill, the recycle rate and other variables ordinarily controlled in such operations.

In prior art pelleting operations common practice was to attach the ends of the pellet recycle hose 13 to the mill by means of stainless steel pipes having about the same outside diameter as the inside diameter of the flexible tube 13. The stainless steel pipes were curved to provide a connection with the sidewall of the pellet mill. The opening in the wall of the pellet mill was approximately twice the area of the inside area of the metal tube and flexible tube 13. With such apparatus it was necessary at frequent intervals for an operator to strike the walls of the pellet mill in the immediate vicinity of the recycle pipe connections in order to prevent undue plugging of these members. Even with occasional jarring of these members frequent plugging of the metal inlet and outlet pipe connections resulted.

By using the adapter of my assembly on either end of the pellet transfer hose 13, along with the knockers or rappers 39, such carbon black pellet mills have been able to operate for extended periods of time without plugging of the recycle apparatus.

The adapters and rappers of my assembly are simple mechanical devices, inexpensive to manufacture and to maintain, and are very efficient for their intended operation.

While I have illustrated the rappers 39 and adapters 27 as being positioned at points near either end of the pellet mill, it is to be realized that these particular points of attachment are not critical. If desired, the rappers 39 and adapters 27 can be positioned at other points on the mill dependent upon the point at which pellets for recycling purposes are desired to be removed from and reintroduced into the mill. In addition, under some conditions, it is desirable to provide two pellet recycle hoses similar to hose 13. In this case one of the hoses can be assembled on the pellet mill in the general position indicated in Figure 1 while the second hose can have its rappers and adapters attached to the mill at some point between the girth gear 55 and the upstream steel tire 15 as desired. In this case considerable larger recycle pellet rates can be achieved than when only one recycle hose is employed. It has been found in many carbon black pelleting operations that relatively large recycle rates tend to produce improved pellets, particularly with carbon blacks which are, in general, difficult to pellet. Materials of construction for building the adapter and rappers of my assembly can be selected from those commercially available.

Furthermore, the particular dimensions which I have given for constructing the adapter and the rapper assemblies are merely illustrative of one embodiment or size of equipment employed on rotating pellet mills. Larger or even smaller adapters and rappers, recycle hose, etc., can, when desired, be employed, that is, the particular dimensions given hereinbefore are not critical.

While certain embodiments of the invention have been described for illustrative purposes, the invention obviously is not limited thereto.

I claim:

1. A carbon black pellet mill assembly comprising, in combination, a rotatable tubular mill having its axis horizontal and having a feed inlet end and a product outlet end, feeding means for introduction of carbon black to be pelleted into the feed end of said mill, means for discharging product from the product outlet end of said mill, a first opening in the wall of said mill nearer the product outlet end than the feed end, a first carbon black pellet recycle adapter, said first adapter including a first box having one side open and its other sides closed, said first box being attached to said mill in such a manner that the open side of said box corresponds to said first opening, a perforate member intermediate said box and said mill and extending across the entire first opening between the mill and the box, a second opening in the wall of said mill nearer the feed inlet end than the product outlet end, a second carbon black pellet recycle adapter, said second adapter including a second box having one side open and its other sides closed, said second box being attached to said mill in such a manner that the open side of said second box corresponds to said second opening, a flexible hose disposed helically around said mill and communicating said first adapter with said second adapter in such a manner that upon rotation of said mill in its normal pelleting operation pellets enter said first adapter and pass through said hose and re-enter said mill by way of said second adapter, a first rapper attached to one closed side of said first box, a second rapper attached to one closed side of said second box, said first and second rappers being adapted to rap their respective adapters upon rotation of said pellet mill thereby preventing deposition of carbon black on the inner walls of said adapters.

2. A carbon black pellet mill assembly comprising, in combination, a rotatable tubular mill having its axis horizontal and having a feed inlet end and a product outlet end, feeding means for introduction of carbon black to be pelleted into the feed end of said mill, means for discharging product from the product outlet end of said mill, a first opening in the wall of said mill nearer the product outlet end than the feed end, a first carbon black pellet recycle adapter, said first adapter including a first box having one side open and its other sides closed, said first box being attached to said mill in such a manner that the open side of said box corresponds to said first opening, a second opening in the wall of said mill nearer the feed inlet end than the product outlet end, a second carbon black pellet recycle adapter, said second adapter including a second box having one side open and its other sides closed, said second box being attached to said mill in such a manner that the open side of said second box corresponds to said second opening, a flexible hose disposed helically around said mill and communicating said first adapter with said second adapter in such a manner that upon rotation of said mill in its normal pelleting operation pellets enter said first adapter and pass through said hose and re-enter said mill by way of said second adapter, a first rapper attached to one closed side of said first box, a second rapper attached to one closed side of said second box, said first and second rappers being adapted to rap their respective adapters upon rotation of said pellet mill thereby preventing deposition of carbon black on the inner walls of said adapters.

3. In the apparatus of claim 1 wherein said rappers are disposed on the surface of each of said first and second adapters opposite said openings in the wall of said mill.

4. In the apparatus of claim 2 wherein said rappers are disposed on the surface of each of said first and second adapters opposite said openings in the wall of said mill.

5. In the apparatus of claim 1 wherein each rapper comprises a tubular member having one end closed by its supporting adapter, the other end of each tubular member also having a closure, and a separate weighted element disposed slidably within each rapper tubular member in such a manner that as said mill rotates each slidable element slides longitudinally in its enclosing tubular member and impinges with force against the closed ends thereof.

6. In the apparatus of claim 3 wherein each rapper comprises a tubular member having one end closed by its supporting adapter, the other end of each tubular member also having a closure, and a separate weighted element disposed slidably within each rapper tubular member in such a manner that as said mill rotates each slidable element slides longitudinally in its enclosing tubular member and impinges with force against the closed ends thereof.

7. In the apparatus of claim 4 wherein each rapper comprises a tubular member having one end closed by its supporting adapter, the other end of each tubular member also having a closure, and a separate weighted element disposed slidably within each rapper tubular member in such a manner that as said mill rotates each slidable element slides longitudinally in its enclosing tubular member and impinges with force against the closed ends thereof.

8. The assembly of claim 1 wherein said first adapter has, in general, the shape of a funnel, the small end of said funnel being attached by a tubular connection to said flexible hose.

9. The assembly of claim 2 wherein said first adapter has, in general, the shape of a funnel, the small end of said funnel being attached by a tubular connection to said flexible hose.

10. A carbon black pellet mill assembly comprising, in combination, a rotatable tubular mill having a feed end and a product end as regards the flow of carbon black, means for introduction of carbon black to be pelleted into the feed end and means for discharging product from the product end, a first opening in the wall of said mill nearer the product end than the feed end, a first carbon black pellet recycle adapter including a first box having one side open, said first box being attached to said mill in such a manner that the open side corresponds to said first opening, a perforate member covering said first opening intermediate said box and said mill, a second opening in the wall of said mill nearer the feed inlet end than the product outlet end, a second carbon black pellet recycle adapter including a second box having one side open, said second box being attached to said mill in such a manner that the open side of said second box corresponds to said second opening, a flexible hose disposed helically around said mill and communicating said first adapter with said second adapter in such a manner that upon rotation of said mill in its normal pelleting operation pellets enter said first adapter and pass through said hose and re-enter said mill by way of said second adapter, a first rapper attached to said first box, a second rapper attached to said second box, said first and second rappers being adapted to rap their respective adapters upon rotation of said mill thereby preventing deposition of carbon black on the inner walls of said adapters.

11. In the apparatus of claim 10 wherein said rappers are disposed on the surface of each of said first and second adapters opposite the openings in the wall of said mill.

12. The assembly of claim 10 wherein said first adapter has in general the shape of a funnel, the small end of said funnel being attached by a tubular connection to said flexible hose.

References Cited in the file of this patent

UNITED STATES PATENTS

| | | |
|---|---|---|
| 389,071 | Glessner | Sept. 4, 1888 |
| 2,263,118 | Carney | Nov. 18, 1941 |
| 2,503,361 | Studebaker | Apr. 11, 1950 |
| 2,638,625 | Studebaker et al. | May 19, 1953 |